(12) United States Patent
Shen et al.

(10) Patent No.: US 11,233,401 B2
(45) Date of Patent: Jan. 25, 2022

(54) DISTRIBUTED ENERGY SYSTEM, ENERGY INTELLIGENT TERMINAL AND CONTROL METHOD THEREOF

(71) Applicant: Persagy Technology CO., LTD., Beijing (CN)

(72) Inventors: Qi Shen, Beijing (CN); Jiang Jiang, Beijing (CN); Hongying Yang, Beijing (CN)

(73) Assignee: Persagy Technology CO., LTD., Beijing (CN)

( * ) Notice: Subject to any disclaimer, the term of this patent is extended or adjusted under 35 U.S.C. 154(b) by 238 days.

(21) Appl. No.: 16/703,271

(22) Filed: Dec. 4, 2019

(65) Prior Publication Data

US 2020/0195010 A1 Jun. 18, 2020

(30) Foreign Application Priority Data

Dec. 12, 2018 (CN) .......................... 201811520698.4

(51) Int. Cl.
    *H02J 3/28* (2006.01)
    *G05B 15/02* (2006.01)
    *G06Q 50/06* (2012.01)

(52) U.S. Cl.
    CPC ................ *H02J 3/28* (2013.01); *G05B 15/02* (2013.01); *G06Q 50/06* (2013.01)

(58) Field of Classification Search
    None
    See application file for complete search history.

(56) References Cited

U.S. PATENT DOCUMENTS 7,962,249 B1 * 6/2011 Zhang ..................... H02J 3/383
                                                            700/295
2002/0010518 A1 * 1/2002 Reid .................... G06Q 10/087
                                                             700/31

(Continued)

FOREIGN PATENT DOCUMENTS

CN          208174746 U      11/2018
CN          109787276 A       5/2019

(Continued)

OTHER PUBLICATIONS

Caldognetto et al., "Microgrids Operation Based on Master-Slave Cooperative Control", Dec. 2014, IEEE Journal of Emerging and Selected Topics in Power Electronics, vol. 2, No. 4. (Year: 2014).*

(Continued)

*Primary Examiner* — Mohammad Ali
*Assistant Examiner* — Kelvin Booker
(74) *Attorney, Agent, or Firm* — Andrus Intellectual Property Law, LLP

(57) ABSTRACT

The present disclosure discloses a distributed energy system, an energy intelligent terminal, and a control method thereof. The energy intelligent terminal determined as the master node controls each energy intelligent terminal in the distributed energy system to set calculation for operation mode in an enabled state when target power changes or a new duty cycle is started at the end of current duty cycle, so as to make each energy intelligent terminal determine an operation mode for the next duty cycle form a corresponding set of alternative operation modes. The operation mode of the distributed energy system can be regulated in real time. The regulating method is simple and improves the efficient and stability of the distributed energy system. Moreover, the distributed energy system according to the embodiments of the present disclosure has ad hoc network capability with the (Continued)

characteristics of fast deployment and plug and play terminals.

18 Claims, 6 Drawing Sheets

(56) References Cited

U.S. PATENT DOCUMENTS

| | | | | |
|---|---|---|---|---|
| 2008/0147335 A1* | 6/2008 | Adest | ............... | H02J 13/00002 |
| | | | | 702/64 |
| 2013/0345884 A1* | 12/2013 | Forbes, Jr. | ............... | G05F 1/66 |
| | | | | 700/286 |
| 2014/0091622 A1* | 4/2014 | Lucas | ............... | H02J 3/383 |
| | | | | 307/19 |
| 2014/0277795 A1* | 9/2014 | Matsuoka | ............... | H04L 63/08 |
| | | | | 700/291 |

FOREIGN PATENT DOCUMENTS

| | | |
|---|---|---|
| CN | 209000209 U | 6/2019 |
| CN | 209229949 U | 8/2019 |

OTHER PUBLICATIONS

Lai et al., "Distributed Multi-DER Cooperative Control for Master-Slave-Organized Microgrid Networks With Limited Communication Bandwidth", Aug. 25, 2018, IEEE Transactions On Industrial Informatics, vol. 15, No. 6, Jun. 2019. (Year: 2018).*

Pavic et al., "Decentralized Master-Slave Communication and Control Architecture of a Battery Swapping Station", 2018, IEEE. (Year: 2018).*

\* cited by examiner

DISTRIBUTED ENERGY SYSTEM, ENERGY INTELLIGENT TERMINAL AND CONTROL METHOD THEREOF

CROSS REFERENCE TO RELATED APPLICATIONS

The present application claims the priority of the Chinese application No. 201811520698.4 with the title of "DISTRIBUTED ENERGY SYSTEM, ENERGY INTELLIGENT TERMINAL AND CONTROL METHOD THEREOF" filed on Dec. 12, 2018, the entire contents of which are incorporated herein by reference.

TECHNICAL FIELD

The present disclosure relates to the field of electric power supply technology, and more particular to a distributed energy system, an energy intelligent terminal, and a control method thereof.

BACKGROUND

With the ever-growing demand for energy and increasing pressure for environmental protection, distributed energy system, as an open energy system, is a powerful complement to traditional centralized energy supply systems, which not only includes multiple energy inputs but also can satisfy a variety of energy needs of users simultaneously. However, the large number of distributed energy system being connected to the power grid has brought about unignored impacts. Therefore, how to make the distributed energy system realize the absorption of energy in situ and improve the efficiency and stability of distributed energy system is a problem to be solved imperatively.

SUMMARY

In view of this, the embodiments of the present disclosure provide a distributed energy system, an energy intelligent terminal and a control method thereof so as to regulate operation mode of the distributed energy system in real time. The regulating method is simple and improves the efficiency and stability of the distributed energy system.

According to a first aspect of the present disclosure, it provides a control method for a distributed energy system, wherein the distributed energy system comprises multiple energy intelligent terminals connected through a network, and the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

Determining an energy intelligent terminal as a master node and other energy intelligent terminals as slave nodes;

Controlling, by the master node, each energy intelligent terminal to set the calculation for operation mode in an enabled state in response to a change in target power or a new duty cycle being started at the end of current duty cycle; and Determining, by each energy intelligent terminal in response to the calculation for operation mode being set in an enabled state, an operation mode for the next duty cycle from the corresponding set of alternative operation modes and setting the calculation for operation mode in a disabled state.

In one embodiment, determining, by each energy intelligent terminal in response to the calculation for operation mode being set in the enabled state, an operation mode for the next duty cycle from the corresponding set of alternative operation modes comprises:

Updating, in response to the error between a sum of initial random external input power that can be assumed by each of all the energy intelligent terminals and the target power satisfying an iteration start condition, the alternative operation mode for each energy intelligent terminal in an iterative manner until an iteration exit condition being satisfied, the iteration exit condition comprising the error between the sum of the random external input power and the target power in the iteration period being less than or equal to an error threshold, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution; and determining the alternative operation mode for each energy intelligent terminal in the final iteration period as the operation mode for the next duty cycle, wherein, in each iteration period, the mode probability distribution to which each energy intelligent terminal corresponds is regulated and the alternative operation mode is reselected based on the regulated mode probability distribution.

In one embodiment, regulating, in each iteration period, the mode probability distribution to which each energy intelligent terminal corresponds comprises:

initializing, in response to a change in operation state of the load and/or the battery to which the energy intelligent terminal corresponds, the mode probability distribution to which the energy intelligent terminal corresponds.

In one embodiment, the control method further comprises:

controlling, in response to a change in operation state of the load to which the energy intelligent terminal corresponds when the calculation for operation mode is in the disabled state, the state of the energy intelligent terminal to change to the state in which the change of the external input power is kept to a minimum.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to continue to charge the battery in response to the load being switched from a working state to a disconnection state when the external input supplies power to both of the load and the battery.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to charge the battery in response to the load being switched from a working state to a disconnection state when the external input supplies power to the load.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a discharging state to a disconnection state in response to the load being switched from a working state to a disconnection state when there is no external input.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to supply power to the load in response to the load being switched from a disconnection state to a working state when the external input charges the battery, and controlling the external input to stop charging the battery.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a disconnection state to a discharging state to supply power to the load in response to the load being switched from a disconnection state to a working state when there is no external input.

In one embodiment, controlling, by the master node, each energy intelligent terminal to set the calculation for operation mode in an enabled state in response to a change in target power or a new duty cycle being started at the end of current duty cycle comprises:

initiating and establishing, by the master node, a spanning tree that connects all the slave nodes in the distributed energy system; and sending, by the mast node, an instruction that the calculation for operation mode is set in the enabled state to each energy intelligent terminal according to the connection relationship of the spanning tree.

According to a second aspect of the present disclosure, it provides a control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

setting calculation for operation mode in an enabled state after receiving an instruction that target power changes or next duty cycle is started; and determining an operation mode for the next duty cycle from a set of alternative operation modes to which the energy intelligent terminal corresponds through the calculation for operation mode, and setting the calculation for operation mode in a disabled state.

In one embodiment, determining an operation mode for the next duty cycle from a set of alternative operation modes to which the energy intelligent terminal corresponds through the calculation for operation mode comprises:

updating the alternative operation mode in an iterative manner in response to an instruction that an iteration is started; and determining, in response to an instruction that the iteration is exited, the alternative operation mode to which the final iteration period corresponds as the operation mode for the next duty cycle, wherein, in each iteration period, the corresponding mode probability distribution is regulated and the alternative operation mode is reselected based on the regulated mode probability distribution.

In one embodiment, regulating, in each iteration period, the corresponding mode probability distribution comprises:

initializing, in response to a change in operation state of the load and/or the battery to which the energy intelligent terminal corresponds, the mode probability distribution to which the energy intelligent terminal corresponds.

In one embodiment, the control method further comprises:

controlling, in response to a change in operation state of the load to which the energy intelligent terminal corresponds when the calculation for operation mode is in the disabled state, the state of the energy intelligent terminal to change to the state in which the change of the external input power is kept to a minimum.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to continue to charge the battery in response to the load being switched from a working state to a disconnection state when the external input supplies power to both of the load and the battery.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to charge the battery in response to the load being switched from a working state to a disconnection state when the external input supplies power to the load.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a discharging state to a disconnection state in response to the load being switched from a working state to a disconnection state when there is no external input.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to supply power to the load in response to the load being switched from a disconnection state to a working state when the external input charges the battery, and controlling the external input to stop charging the battery.

In one embodiment, controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a disconnection state to a discharging state to supply power to the load in response to the load being switched from a disconnection state to a working state when there is no external input.

According to a third aspect of the present disclosure, it provides a control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

sending, in response to being determined as a master node, an instruction that next duty cycle is started to control each energy intelligent terminal in a distributed energy system to set calculation for operation mode in an enabled state when target power changes or a new duty cycle is started at the end of current duty cycle, so as to control each energy intelligent terminal to determine an operation mode for the next duty cycle form the corresponding set of alternative operation modes.

In one embodiment, controlling each energy intelligent terminal to determine an operation mode for the next duty cycle form the corresponding set of alternative operation modes comprises:

updating, in response to the error between a sum of initial random external input power that can be assumed by each of all the energy intelligent terminals and the target power satisfying an iteration start condition, the alternative operation mode for each energy intelligent terminal in an iterative manner until an iteration exit condition being satisfied, the iteration exit condition comprising the error between the sum of the random external input power and the target power in the iteration period being less than or equal to an error threshold, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution; and sending an instruction that the iteration is exited to each energy intelligent terminal so as to make each energy intelligent terminal determine the alternative operation mode to which the final iteration period corresponds as operation mode for the next duty cycle, wherein, in each iteration period, each energy intelligent terminal is controlled to regulate the corresponding mode probability distribution and the alternative operation mode is reselected based on the regulated mode probability distribution.

In one embodiment, sending, in response to being determined as a master node, an instruction that next duty cycle is started when the target power changes or the new duty cycle is started at the end of current duty cycle comprises:

initiating and establishing, in response to being determined as a master node, a spanning tree that connects other energy intelligent terminals in the distributed energy system; and sending an instruction that the calculation for operation mode is set in the enabled state to each energy intelligent terminal according to the connection relationship of the spanning tree.

According to a fourth aspect of the present disclosure, it provides an energy intelligent terminal comprising a memory for storing one or more computer program instructions and a processor, wherein, the one or more computer program instructions are executed by the processor to implement the method as described in the second aspect of the present disclosure.

According to a fifth aspect of the present disclosure, it provides an energy intelligent terminal comprising a memory for storing one or more computer program instructions and a processor, wherein, the one or more computer program instructions are executed by the processor to implement the method as described in the third aspect of the present disclosure.

According to a sixth aspect of the present disclosure, it provides a distributed energy system comprising a plurality of energy intelligent terminals, the energy intelligent terminal comprising a memory for storing one or more computer program instructions and a processor, wherein, the one or more computer program instructions are executed by the processor to implement the method as described in the second aspect of the present disclosure; or the one or more computer program instructions are executed by the processor to implement the method as described in the third aspect of the present disclosure.

According to the technical solutions of the embodiments of the present disclosure, the energy intelligent terminal determined as the master node controls each energy intelligent terminal in the distributed energy system to set the calculation for operation mode in the enabled state when the target power changes or a new duty cycle is started at the end of current duty cycle, so as to make each energy intelligent terminal determine an operation mode for the next duty cycle form the corresponding set of alternative operation modes. Therefore, according to the embodiments of the present disclosure, the operation mode of the distributed energy system can be regulated in real time. The regulating method is simple and improves the efficient and stability of the distributed energy system. Moreover, the distributed energy system according to the embodiments of the present disclosure has ad hoc network capability with the characteristics of fast deployment and plug and play terminals.

BRIEF DESCRIPTION OF THE DRAWINGS

The above and other objects, features and advantages of the present disclosure will become more apparent from the following description of the embodiments of the present disclosure with reference to the accompanying drawings in which.

DETAILED DESCRIPTION

The present disclosure will be described below with reference to the embodiments, but the present disclosure is not merely limited to these embodiments. Some specific details are concretely described in the following description of the details of the present disclosure. The present disclosure can be understood by those skilled in the art without those descriptions of the details. In order to avoid obscuring the essence of the present disclosure, well-known methods, processes, procedures, components and circuits are not described in detail.

In addition, it will be understood by those ordinary skilled in the art that the drawings provided herein are for illustrative purpose and are not necessarily drawn to scale.

Unless the context clearly requires, otherwise, the words "comprising", "including" and the like in the entire specification and claims should be construed as the meaning of inclusion rather than the meaning of exclusion or exhaustion, that is, the meaning of "including but not limited to".

In the description of the present disclosure, it needs to be understood that the terms "first", "second" and the like are for illustrative purposes only and should not to be construed as indicating or implying relative importance. In addition, in the description of the present disclosure, the meaning of "a plurality of" means two or more, unless otherwise specified.

Figure 1:
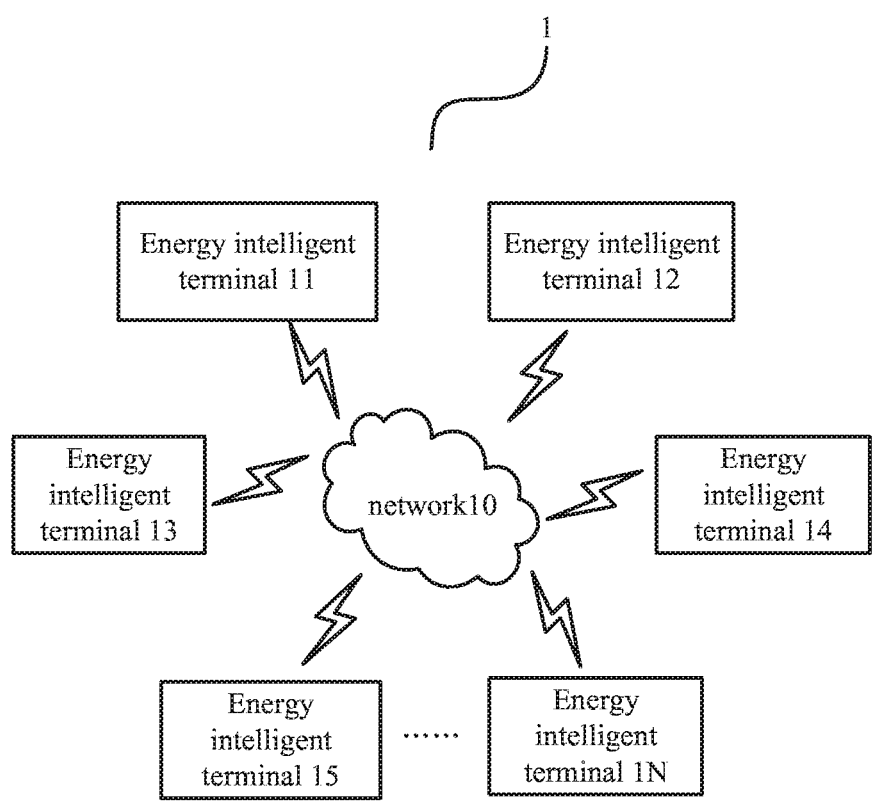
FIG. 1 is a schematic diagram of a distributed energy system according to an embodiment of the present disclosure.

FIG. 1 is a schematic diagram of a distributed energy system according to an embodiment of the present disclosure. As shown in FIG. 1, the distributed energy system 1 includes energy intelligent terminals 11-1N that are networked and communicate through a network 10. Each energy intelligent terminal supplies power to a corresponding load based on a battery or an external input and/or charges the battery through the external input. Each energy intelligent terminal has an ad hoc network capability and can control its own operation mode. Each energy intelligent terminal has a corresponding set of alternative operation modes in different operation states. Different alternative operation modes in the set of alternative operation modes assume corresponding external input power. Among them, the external input can be a public power grid or a power generation device.

Figure 2:
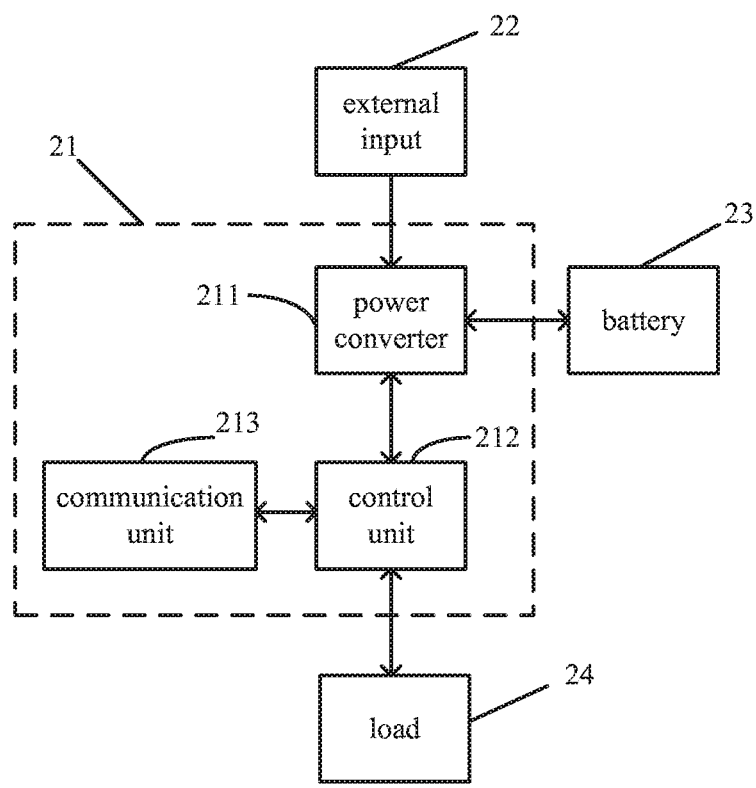
FIG. 2 is a schematic diagram of an energy intelligent terminal according to an embodiment of the present disclosure.

FIG. 2 is a schematic diagram of an energy intelligent terminal according to an embodiment of the present disclosure. As shown in FIG. 2, the energy intelligent terminal 21 of the present embodiment includes a power converter 211, a control unit 212 and a communication unit 213. The energy intelligent terminal 2 has a corresponding battery 23 and a load 24. The power converter 211 is configured to convert the voltage of the external input 22 into a charging voltage that charges the battery 23 and/or a supply voltage that powers the load. The control unit 212 is configured to acquire a corresponding set of alternative operation modes according to current energy storage of the battery 23 and switch state of the load 24 in current duty cycle, and select an alternative operation mode according to mode probability distribution and control, according to a received instruction, the energy intelligent terminal 21 to operate in accordance with the operation mode to which the instruction corresponds in the next duty cycle. The communication unit 213 is configured to communicate with other energy intelligent terminals. The energy intelligent terminal may include the following states:

| load state | current energy storage e | set of alternative operation modes V |
|---|---|---|
| state 1 | working state | e < Pc * T | V = {Pc, Pc + Ps} |
| state 2 | working state | e > C – Ps * T | V = {0, Pc} |
| state 3 | working state | Pc * T < e < C – Ps * T | V = {0, Pc, Pc + Ps} |
| state 4 | disconnection state | e > C – Ps * T | V = {0} |
| state 5 | disconnection state | e < C – Ps * T | V = {0, Ps} | where e is the current energy storage of the corresponding battery, C is the energy storage capacity of the corresponding battery, Pc is the energy consumption power of the corresponding load, T is the duty cycle, and Ps is the energy storage power of the corresponding battery.

State 1: the load to which the energy intelligent terminal corresponds is in working state, and the current energy storage of the corresponding battery e<Pc*T, that is, insufficient to supply power to the load. The set of alternative operation modes V to which the energy intelligent terminal corresponds is:

$V=\{Pc,Pc+Ps\}$

That is to say, the energy intelligent terminal has two alternative operation modes at this time. One alternative operation mode is that the energy intelligent terminal controls the external input to only supply power to the load, and the corresponding external input power is Pc in this case. The other alternative operation mode is that the energy intelligent terminal controls the external input to supply power to the load and to charge the battery simultaneously and the corresponding external input power is Pc+Ps in this case.

State 2: the load to which the energy intelligent terminal corresponds is in working state, and the current energy storage of the corresponding battery e>C–Ps*T, that is, the current energy storage of the battery is basically full (which will exceed the energy storage capacity C of the battery if charged for one more duty cycle) and it is not required to charge the battery through the external input, and the set of alternative operation modes V to which the energy intelligent terminal corresponds is:

$V=\{0,Pc\}$

That is to say, the energy intelligent terminal has two alternative operation modes at this time. One alternative operation mode is that the energy intelligent terminal controls the corresponding battery to supply power to the load, and the corresponding external input power is 0 in this case.

The other alternative operation mode is that the energy intelligent terminal controls the external input to supply power to the load, and the corresponding external input power is Pc in this case.

State 3: the load to which the energy intelligent terminal corresponds is in working state, and the current energy storage of the corresponding battery Pc*T<e<C−Ps*T, that is, the current energy storage of the battery can either supply power to the load or the battery can be charged by the external input. The set of alternative operation modes V to which the energy intelligent terminal corresponds is:

$$V=\{0,Pc,Pc+Ps\}$$

That is to say, the energy intelligent terminal has three alternative operation modes at this time. The first alternative operation mode is that the energy intelligent terminal controls the corresponding battery to supply power to the load, and the corresponding external input power is 0 in this case. The second alternative operation mode is that the energy intelligent terminal controls the external input to supply power to the load, and the corresponding external input power is Pc in this case. The third alternative operation mode is that the energy intelligent terminal controls the external input to supply power to the load and to charge the battery simultaneously, and the corresponding external input power is Pc+Ps in this case.

State 4: the load to which the energy intelligent terminal corresponds is in disconnection state, and the current energy storage of the corresponding battery e<C−Ps*T, that is, the current energy storage of the battery is basically full and it is not required to charge the battery through the external input. The set of alternative operation modes V to which the energy intelligent terminal corresponds is:

$$V=\{0\}$$

That is to say, the energy intelligent terminal has one alternative operation mode at this time, that is, controlling the external input to neither supply power to the load nor charge the battery, and the corresponding external input power is 0 in this case.

State 5: the load to which the energy intelligent terminal corresponds is in disconnection state, and the current energy storage of the corresponding battery e<C−Ps*T, that is, the battery can be charged. The set of alternative operation modes V to which the energy intelligent terminal corresponds is:

$$V=\{0,Ps\}$$

That is to say, when the load does not consume energy and the battery can be continued to be charged, the energy intelligent terminal has two alternative operation modes at this time. One alternative operation mode is to control the external input to neither supply power to the load nor charge the battery, and the corresponding external input power is 0 in this case. The other alternative operation mode is to control the external input to charge the battery, and the corresponding external input power is Ps in this case.

In the present embodiment, the energy intelligent terminal determined as the master node controls each energy intelligent terminal in the distributed energy system to set the calculation for operation mode in the enabled state when target power changes (i.e. the given external input total power changes) or a new duty cycle is started at the end of current duty cycle, so as to make each energy intelligent terminal determine an operation mode for the next duty cycle form the corresponding set of alternative operation modes. Therefore, according to the present embodiment, the operation mode of the distributed energy system can be regulated in real time. The regulating method is simple and improves the efficient and stability of the distributed energy system.

In the present embodiment, by regulating the control of the distributed energy system, when a new energy consumption control target (i.e. a given external input total power) is set or a new duty cycle is started at the end of current duty cycle, the energy consumption object ((load, battery, etc.) responds quickly to and reasonably shares the given external input total power, so that the actual external input total power is basically in line with the energy consumption control target, which makes the distributed energy system realize the absorption of energy in situ and improve the overall efficiency and stability of distributed energy systems. At the meanwhile, the distributed energy system of the present embodiment can achieve economical optimization for the costs of system energy consumption.

Figure 3:
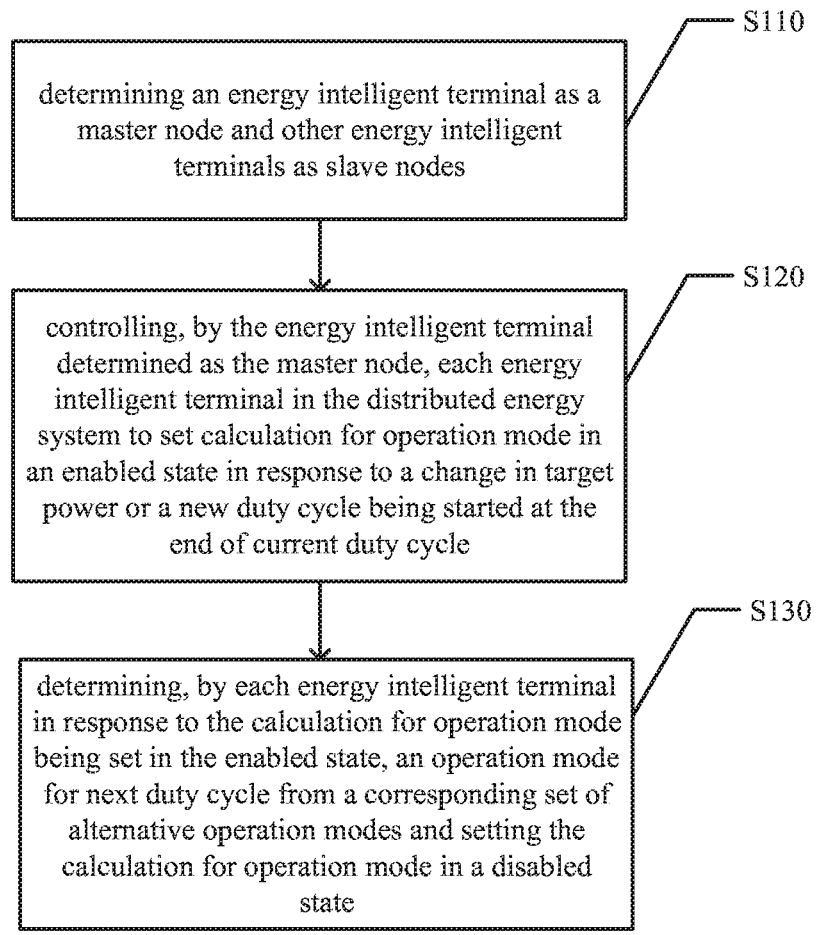
FIG. 3 is a flow chart of a control method for the distributed energy system according to an embodiment of the present disclosure.

FIG. 3 is a flow chart of a control method for the distributed energy system according to an embodiment of the present disclosure. As shown in FIG. 3, the control method for the distributed energy system of the present embodiment includes the following steps:

Step S110, determining an energy intelligent terminal as a master node and other energy intelligent terminals as slave nodes. In one embodiment, the master node is randomly selected in the distributed energy system so that the master nodes in different duty cycles may be different, thereby avoiding the system being paralyzed due to the damage of the master node, which improves the stability of the system.

Step S120, controlling, by the energy intelligent terminal determined as the master node, each energy intelligent terminal in the distributed energy system to set the calculation for operation mode in an enabled state in response to a change in target power or a new duty cycle being started at the end of current duty cycle, so that each energy intelligent terminal begins to calculate the operation mode for the next duty cycle. In one embodiment, the master node initiates and establishes a spanning tree that connects all the slave nodes in the distributed energy system, and sends an instruction that the calculation for operation mode is set in the enabled state to each energy intelligent terminal according to the connection relationship of the spanning tree. It should be understood that the master node controls each energy intelligent terminal to initialize its corresponding mode probability distribution to an initial mode probability distribution when the target power changes or a new duty cycle is started at the end of one duty cycle.

Figure 4:
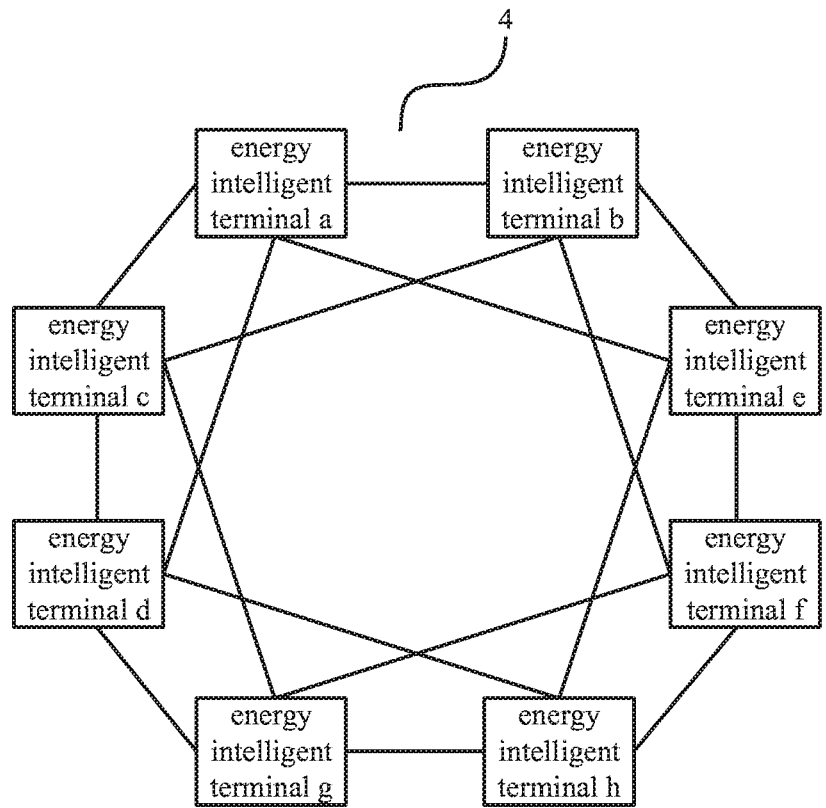
FIG. 4 is a schematic diagram of a distributed energy system according to an embodiment of the present disclosure in one implementation.

FIG. 4 is a schematic diagram of a distributed energy system according to an embodiment of the present disclosure in one implementation. As shown in FIG. 4, the distributed energy system 4 includes energy intelligent terminals a-h. In the networking of the present embodiment, the communication connections between the energy intelligent terminals are as shown in FIG. 4, and the two energy intelligent terminals connected by a straight line can communicate with each other.

Figure 5:
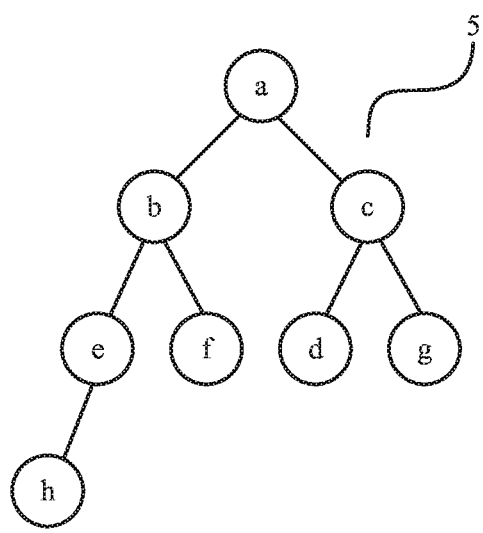
FIG. 5 is a schematic diagram of a spanning tree established by a breadth-first method according to an embodiment of the present disclosure.

FIG. 5 is a schematic diagram of a spanning tree established by a breadth-first method according to an embodiment of the present disclosure. As shown in FIG. 5, the binary tree 5 is a binary tree of the distributed energy system 4 established by the breadth-first method. Among them, the energy intelligent terminal a is selected as the master node, and the energy intelligent terminals b-h are selected as the slave nodes. The master node a can send an instruction that the calculation for operation mode in set in an enabled state to the energy intelligent terminals b-h through its connection relationship with the slave nodes. For example, the master node a now sends instructions to the slave nodes b and c. The slave nodes b and c send instructions to the slave nodes e and f and slave nodes d and g, respectively. The slave node e sends the instruction to the slave node h. It should be understood that an energy intelligent terminal can be randomly selected in the distributed energy system as the master node. Meanwhile, the above-described traversal method based on breadth-first is merely exemplary, and methods that can initiate a spanning tree in other manners to implement the above-described function and other traversal method for the spanning tree can be applied to the present embodiment.

Step S130, determining, by each energy intelligent terminal in response to the calculation for operation mode being set in the enabled state, an operation mode for next duty cycle from a corresponding set of alternative operation modes and setting the calculation for operation mode in a disabled state.

Figure 6:
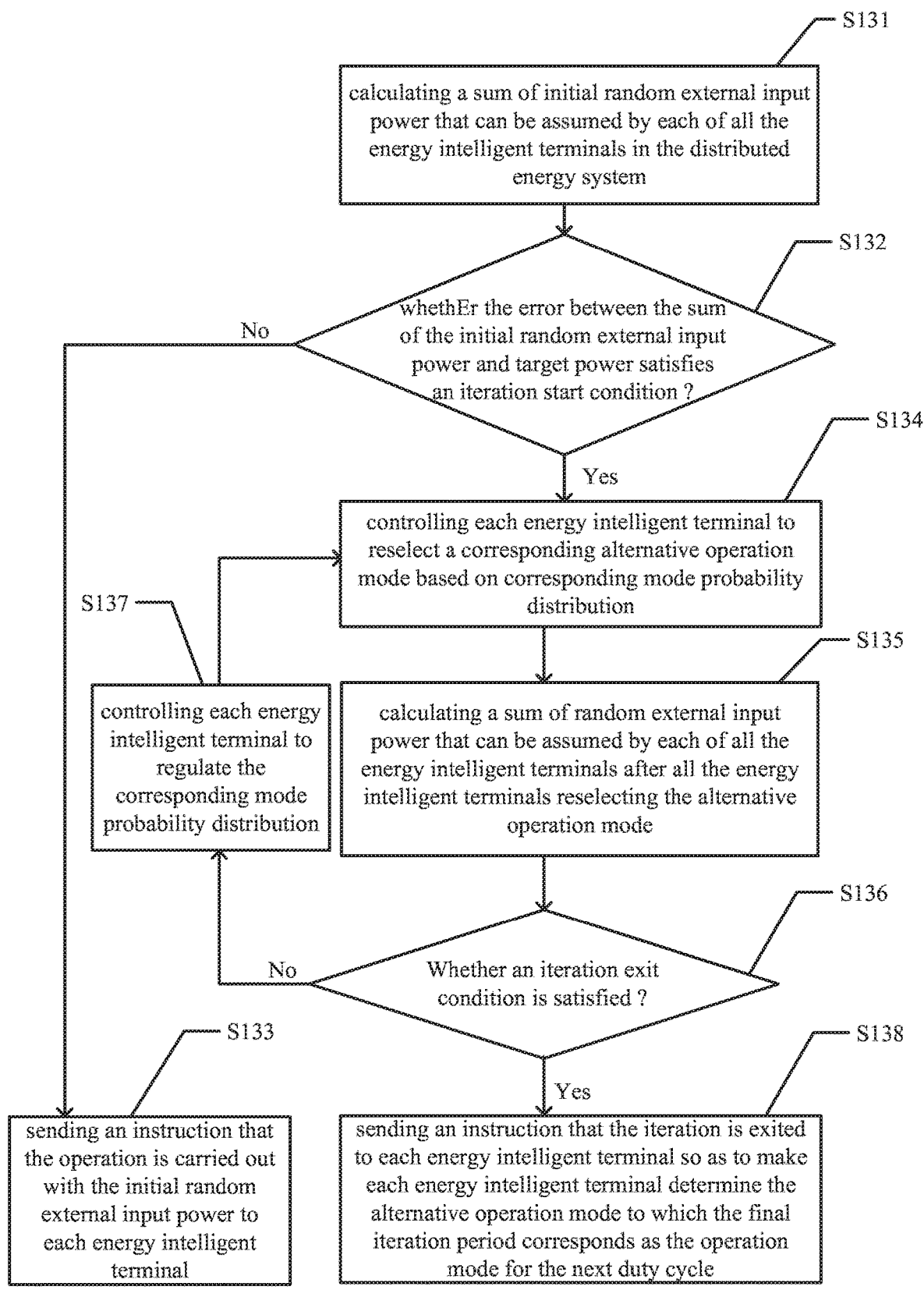
FIG. 6 is a flowchart of calculation for operation mode according to an embodiment of the present disclosure.

Specifically, FIG. 6 is a flowchart of calculation for operation mode according to an embodiment of the present disclosure. As shown in FIG. 6, the calculation for operation mode of the embodiment of the present disclosure includes the following steps:

Step S131, calculating, by the master node, a sum of initial random external input power that can be assumed by each of all the energy intelligent terminals in the distributed energy system. The initial random external input power is obtained from initial alternative operation mode randomly selected by each energy intelligent terminal. Each energy intelligent terminal randomly selects the initial alternative operation mode from the set of alternative operation modes to which its current state corresponds according to an initial mode probability distribution.

When the target power changes or a new duty cycle is started at the end of one duty cycle, each energy intelligent terminal initializes a corresponding mode probability distribution to the initial mode probability distribution according to its current state, and randomly selects an initial alternative operation mode from the set of alternative operation modes to which its current state corresponds according to the initial mode probability distribution, wherein the initial mode probability distribution is determined by the number of items in the corresponding set of alternative operation modes. In one embodiment, the initial mode probability for each alternative operation mode in the set of alternative operation modes is identical. For example, when there are two alternative operation modes in the set of alternative operation modes, the initial mode probability for each of the alternative operation modes is ½.

In one embodiment, calculating the sum of initial random external input power that can be assumed by each of all the energy intelligent terminals in the distributed energy system specifically includes:

calculating, by the master node, the sum of the initial random external input power that can be assumed by each of all the energy intelligent terminals by receiving a sum of the initial random external input power that can be assumed by subtrees to which each energy intelligent terminal gradually reports according to the connection relationship of the above spanning tree. That is to say, the sum of the initial random external input power that can be assumed by each of all the energy intelligent terminals can be calculated by traversing the spanning tree of all the energy intelligent terminals, thereby improving the efficiency of calculating the sum of the initial external input power and making the networking of the distributed energy system simple and flexible. It should be understood that other method that can enable the master node to calculate the sum of the initial random external input power can be applied to the present embodiment.

In one embodiment, as shown in FIG. 5, the energy intelligent terminals a-h randomly select initial alternative operation modes from the sets of alternative operation modes to which their current states correspond respectively according to the initial mode probability distribution, and gradually report the sum of the initial random external input power that can be assumed by subtrees according to the connection relationship of the binary tree 5. Specifically, the energy intelligent terminal h reports its initial random external input power Ph to the energy intelligent terminal e. The energy intelligent terminal e calculates the sum (Pe+Ph) of the initial random external input power that can be assumed by the subtree with itself as apex (including the energy intelligent terminals e and h) and reports the same to the energy intelligent terminal b. The energy intelligent terminal f reports its initial random external input power Pf to the energy intelligent terminal b. The energy intelligent terminal b calculates the sum (Pb+(Pe+Ph)+Pf) of the initial random external input power that can be assumed by the subtree with itself as apex (including the energy intelligent terminals b, e, f and h) and reports the same to the energy intelligent terminal a. Similarly, the energy intelligent terminal c reports the sum (Pc+(Pd+Pg)) of the initial random external input power that can be assumed by the subtree with itself as apex to the energy intelligent terminal a. The energy intelligent terminal a calculates the sum (Pa+(Pe+(Pe+Ph)+Pf)+(Pc+(Pd+Pg)))) of the initial random external input power that can be assumed by each of all the energy intelligent terminals a-h in the distributed energy system 4. It should be understood that each energy intelligent terminal can send its corresponding initial random external input power to the master node via other energy intelligent terminals communicatively connected thereto according to the connection relationship of the spanning tree, and the master node calculates the sum of the initial random external input power after receiving the initial random external input power that can be assumed by each of all the energy intelligent terminals. Meanwhile, the above-described traversal method based on breadth-first is merely exemplary, and methods that can initiate a spanning tree in other manners to implement the above-described function and other traversal method for the spanning tree can be applied to the present embodiment.

Step S132, determining whether the error between the sum of the initial random external input power that can be assumed by each of all the energy intelligent terminals and the target power satisfies an iteration start condition. In one embodiment, the iteration start condition may specifically be that the error between the sum of the initial random external input power that can be assumed by each of all the energy intelligent terminals and the target power is larger than an error threshold. In response to that the error between the sum of the initial random external input power that can be assumed by each of all the energy intelligent terminals and the target power does not satisfy the iteration start condition, step S133 is performed. In response to that the error between the sum of the initial random external input power that can be assumed by each of all the energy intelligent terminals and the target power satisfies the iteration start condition, step S134 is performed.

Step S133, sending, by the master node, an instruction that the operation is carried out with the initial random external input power to each energy intelligent terminal.

Each energy intelligent terminal is controlled by the instruction to use the initial alternative operation mode as the operation mode for the next duty cycle.

Step S134, controlling each energy intelligent terminal to reselect a corresponding alternative operation mode based on the corresponding mode probability distribution. Wherein, in the 1st iteration period, the mode probability distribution to which each energy intelligent terminal corresponds is the initial mode probability distribution. In the kth (k>1) iteration period, each energy intelligent terminal is controlled by the instruction of the master node to obtain a corresponding mode probability distribution by calculating according to a predetermined algorithm.

That is, the master node controls each energy intelligent terminal to reselect the corresponding alternative operation mode based on the corresponding mode probability distribution in response to an initial random power difference ΔW0>ε. The initial random power difference ΔW0 is the error between the sum Pv0 of the initial random external input power that can be assumed by each of all the energy intelligent terminals and the target power Pth, and ε is the error threshold. When the initial random power difference ΔW0 satisfies the iteration condition, the sum Pv0 of the initial random external input power is taken as the sum of the random external input power in the 0th iteration.

Step S135: calculating a sum of random external input power that can be assumed by each of all the energy intelligent terminals after all the energy intelligent terminals reselecting the alternative operation mode.

Step S136, determining whether an iteration exit condition is satisfied. In one embodiment, the iteration exit condition includes the error between the sum of the random external input power and the target power being less than the error threshold. In another embodiment, the iteration exit condition further includes the number of iterations reaching an iteration number threshold. That is, the iteration number threshold is preset to avoid iteration calculation timeout to improve the efficiency of the distributed energy system. That is to say, the iteration is exited in response to the error between the sum of the random external input power and the target power being less than the error threshold or the number of iterations reaching the iteration number threshold. In response to the iteration exit condition being not satisfied, step S137 is performed. In response to the iteration exit condition being satisfied, step S138 is performed.

Step S137, controlling each energy intelligent terminal to regulate the corresponding mode probability distribution. The master node determines a probability indicator according to the random power difference in the current iteration period and the random power difference in the previous iteration period, and sends the probability indicator to control each energy intelligent terminal to regulate the corresponding mode probability distribution according to the probability indicator, and reselect the corresponding alternative operation mode based on the corresponding regulated mode probability distribution, wherein the random power difference is the error between the sum of the random external input power that can be assumed by each of all the energy intelligent terminals and the target power.

Specifically, the master node determines a probability indicator λ according to the random power difference in the current iteration period and the random power difference in the previous iteration period and sends the probability indicator λ to each energy intelligent terminal, wherein the random power difference is the error between the sum Pv(k) of the random external input power and the target power Pth, and k is the number of iterations.

In response to the probability indicator λ being of a first state, each energy intelligent terminal calculates, according to a predetermined algorithm, a probability for the alternative operation mode to which the current iteration period corresponds and probabilities for other alternative operation modes in the corresponding set of alternative operation modes to regulate the mode probability distribution to which each energy intelligent terminal corresponds. Or, in response to the probability indicator λ being of a second state, each energy intelligent terminal calculates, according to a predetermined algorithm, a probability for the alternative operation mode to which the previous iteration period corresponds and probabilities for other alternative operation modes in the corresponding set of alternative operation modes to regulate the mode probability distribution to which each energy intelligent terminal corresponds.

The probability indicator λ is determined by an error probability Prob, wherein the error probability Prob satisfies the following formula:

$$Prob = \exp\left[-\frac{\max\{\Delta W(k) - \Delta W(k-1), 0\}}{L}\right]$$

where L is a simulated annealing constant that can be set according to actual situation of the distributed energy system (such as the energy consumption of the load to which the energy intelligent terminal corresponds, the energy storage capacity of the battery).

In one embodiment, the probability for the probability indicator λ=1 (i.e., the first state) is Prob, and the probability for the probability indicator λ=0 (i.e., the second state) is (1-Prob). The master node determines the state of the probability indicator λ according to the state probability distribution (Prob, 1-Prob) of the probability indicator λ, and sends the state of the probability indicator λ to all the energy intelligent terminals based on the spanning tree.

When the probability indictor λ is of the first state (λ=1), it is characterized that the alternative operation mode selected by each energy intelligent terminal in the distributed energy system in the current iteration period is preferred, that is, the sum Pv(k) of the random external input power to which the alternative operation mode selected by each energy intelligent terminal in the current iteration period corresponds is closer to the target power Pth.

When the probability indictor λ is of the second state (λ=0), it is characterized that the alternative operation mode selected by each energy intelligent terminal in the distributed energy system in the previous iteration period is preferred, that is, the sum Pv(k-1) of the random external input power to which the alternative operation mode selected by each energy intelligent terminal in the previous iteration period corresponds is closer to the target power Pth.

Each energy intelligent terminal marks the alternative operation mode selected in the current iteration period $Pr_{j*}$ in response to the probability indicator λ being of the first state. Each energy intelligent terminal marks the alternative operation mode selected in the previous iteration period as $Pr_{j*}$, in response to the probability indicator λ being of the second state. In one embodiment, the mode probability distribution of each energy intelligent terminal is updated by the following formula:

$$Pr_{j*} = \min\{\gamma Pr_{j*}, 1\}$$

where γ is update coefficient. Preferably, γ=1.1.

When the set of alternative operation modes to which the current state of the energy intelligent terminal corresponds includes two alternative operation modes, the probability for the other alternative operation mode is Pr=1-Pr$_{j*}$.

When the set of alternative operation modes to which the current state of the energy intelligent terminal corresponds includes three alternative operation modes, the probability for the other two alternative operation modes satisfies the following formulas:

$$pr_{j1} = \frac{pr_{j1}}{pr_{j1} + pr_{j2}}(1 - Pr_{j*})$$

$$pr_{j2} = \frac{pr_{j2}}{pr_{j1} + pr_{j2}}(1 - Pr_{j*})$$

Thereby, the probability that a preferred alternative operation mode is selected in each energy intelligent terminal can be improved, thereby improving the efficiency of the distributed energy system.

That is to say, in the iteration process, step S134 to step S137 is performed cyclically until the iteration exit condition is satisfied, and then step S138 is performed.

It should be understood that the simulated annealing method is used in the present embodiment to determine the operation mode for the next duty cycle. However, other methods capable of realizing the above functions (for example, the particle swarm method, the generalized gradient descent method, etc.) can be applied to the present embodiment.

Step S138: sending an instruction that the iteration is exited to each energy intelligent terminal so as to make each energy intelligent terminal determine the alternative operation mode to which the final iteration period corresponds as the operation mode for the next duty cycle. In one embodiment, the master node sends the instruction that the iteration is exited to each energy intelligent terminal through the connection relationship of the spanning tree to which each energy intelligent terminal corresponds.

In one embodiment, in the iteration process, the mode probability distribution to which the energy intelligent terminal corresponds is initialized in response to a change in the operation state of the load and/or the battery to which the energy intelligent terminal corresponds. For example, the set of alternative operation modes to which an energy intelligent terminal corresponds is {0, Pc, Pc+Ps}. If the load to which the energy intelligent terminal corresponds is disconnected in the iteration period, the set of alternative operation modes to which the energy intelligent terminal corresponds is changed to {0, Ps}. Thus, the mode probability distribution to which the energy intelligent terminal corresponds is initialized as {½, ½}.

In one embodiment, the step of calculating the operation mode of the present embodiment further includes: the master node calculating a sum of maximal external input power that can be assumed by each of all the energy intelligent terminals in the distributed energy system, and sending an instruction that the operation is carried out with the maximal external input power in response to the sum of maximal external input power that can be assumed by each of all the energy intelligent terminals being less than or equal to the target power. That is to say, in response to the sum of maximal external input power that can be assumed by each of all the energy intelligent terminals being less than or equal to the target power, the master node controls each energy intelligent terminal to select the alternative operation mode corresponding to the maximum external input power as the operation mode for the next duty cycle.

In one embodiment, the step of calculating the operation mode of the present embodiment further includes: in response to being determined as the master node, calculating a sum of minimal external input power that can be assumed by each of all the energy intelligent terminals in the distributed energy system, and sending an instruction that the operation is carried out with the minimal external input power in response to the sum of minimal external input power that can be assumed by each of all the energy intelligent terminals being larger than or equal to the target power. That is to say, in response to the sum of minimal external input power that can be assumed by each of all the energy intelligent terminals being larger than or equal to the target power, the master node controls each energy intelligent terminal to select the alternative operation mode corresponding to the minimal external input power as the operation mode for the next duty cycle. It is easy to understand that the master node can calculate the sum of the maximal external input power and the sum of the minimum external input power that can be assumed by each of all the energy intelligent terminals based on the spanning tree.

In one embodiment, the sum of the maximal external input power and the sum of the minimal external input power that can be assumed by each of all the energy intelligent terminals can be judged before judging the sum of the initial random external input power that can be assumed by each of all the energy intelligent terminals to improve the energy regulation efficiency of the system.

Therefore, the distributed energy system of the present embodiment can flexibly perform energy regulation in real time, the regulating method is simple, which can greatly improve the efficiency of the system and can achieve economical optimization for the costs of system energy consumption.

At the meanwhile, each of the energy intelligent terminals of the present embodiment corresponds to a load, which can better adapt to on-site requirements of modern distributed energy regulation, and can be applied to the energy regulation for single or multiple types of loads in cooling and heating systems, lighting systems, power systems and so on in building construction. The regulating method is simple, easy to be networked, real-time strong, and high robustness.

In this embodiment, the distributed energy system can be regulated in real time and quickly when the external input power is given, so that the sum of the external input power required by the system does not exceed the target power while satisfying load demands, thereby improving the efficiency of the system.

In one embodiment, the control method for the distributed energy system in the present embodiment further includes: controlling, in response to a change in the operation state of the load to which the energy intelligent terminal corresponds when the calculation for operation mode is in the disabled state, the state of the energy intelligent terminal to be changed to the state in which the change of the external input power is kept to a minimum. That is, each energy intelligent terminal has determined the operation mode for the next duty cycle from the corresponding set of the alternative operation modes in each duty cycle. If the operation state of the load itself to which the energy intelligent terminal corresponds changes, the state of the energy intelligent terminal is controlled to change to the state in which the change of the external input power is kept to a minimum.

The specific situation is shown in Table 1:

TABLE 1

| | before the change of operation state | | | | after the change of operation state | | | |
|---|---|---|---|---|---|---|---|---|
| | load state | battery state | external input state | operation mode | load state | battery state | external input state | operation mode |
| case 1 | working state | charging state | power state | Pc + Ps | disconnection state | charging state | power state | Ps |
| case 2 | working state | disconnection state | power state | Pc | disconnection state | charging state | power state | Ps |
| case 3 | working state | discharging state | disconnection state | 0 | disconnection state | disconnection state | disconnection state | 0 |
| case 4 | disconnection state | charging state | power state | Ps | working state | disconnection state | power state | Pc |
| case 5 | disconnection state | disconnection state | disconnection state | 0 | working state | discharging state | disconnection state | 0 |

That is to say, in the duty cycle, in response to a change in the state of the corresponding load, the corresponding energy intelligent terminal is controlled so that its operation mode is changed in a direction that the external input power changes little, so as to maintain the correspondence between the total external input power of the distributed energy system and the target power to reduce the influence of the change in the state of the energy intelligent terminal itself on the external input power, thereby realizing the real-time regulation of the distributed energy system. The regulating method is simple and improves the stability of the distributed energy system.

It should be understood that the current energy storage of the corresponding battery should be considered when performing the state switching. For example, in case 2, assuming that the current energy storage of the battery before the change of the operation state is full, the operation mode cannot be switched to one that charges the battery or the like.

In the present embodiment, the energy intelligent terminal determined as the master node controls each energy intelligent terminal in the distributed energy system to set the calculation for operation mode in the enabled state when the target power changes or a new duty cycle is started at the end of current duty cycle, so as to make each energy intelligent terminal determine an operation mode for the next duty cycle form the corresponding set of alternative operation modes. Therefore, according to the present embodiment, the operation mode of the distributed energy system can be regulated in real time and quickly. The regulating method is simple and improves the efficient and stability of the distributed energy system.

Figure 7:
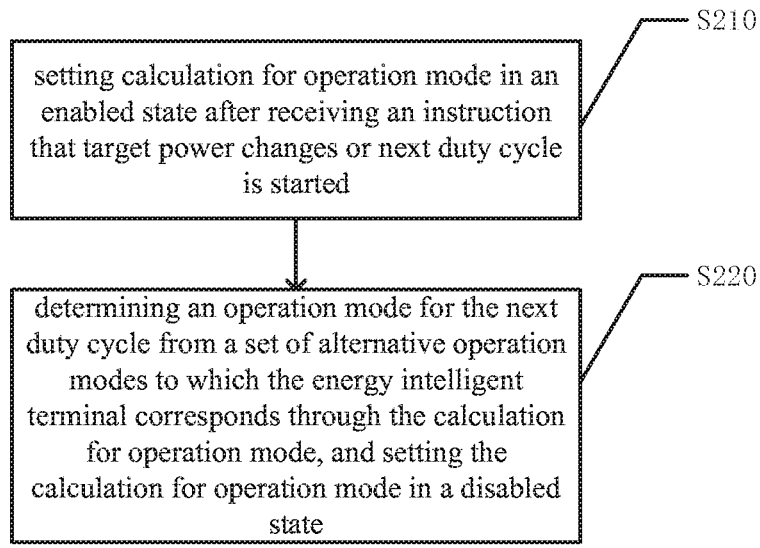
FIG. 7 is a flow chart of a control method for the energy intelligent terminal according to an embodiment of the present disclosure.

FIG. 7 is a flowchart of a control method for an energy intelligent terminal according to an embodiment of the present disclosure. As shown in FIG. 7, the control method for the energy intelligent terminal according to the embodiment of the present disclosure includes the following steps:

Step S210, setting calculation for operation mode in an enabled state after receiving an instruction that target power changes or next duty cycle is started.

Step S220: determining an operation mode for the next duty cycle from a set of alternative operation modes to which the energy intelligent terminal corresponds through the calculation for operation mode, and setting the calculation for operation mode in a disabled state. In one embodiment, each energy intelligent terminal updates the alternative operation mode in an iterative manner in response to an instruction that an iteration is started, and determines the alternative operation mode to which the final iteration period corresponds as the operation mode for the next duty cycle in response to an instruction that the iteration is exited, wherein, in each iteration period, the corresponding mode probability distribution is regulated and the alternative operation mode is reselected based on the regulated mode probability distribution.

In one embodiment, regulating, in each iteration period, the corresponding mode probability distribution comprises: initializing, in response to a change in operation state of the load and/or the battery to which the energy intelligent terminal corresponds, the mode probability distribution to which the energy intelligent terminal corresponds. It should be understood that the specific process of the calculation for operation mode is as that described in the steps of FIG. 6 and will not be repeated in detail herein again.

In one embodiment, the control method for the energy intelligent terminal according to the embodiment of the present disclosure further comprises: controlling, in response to a change in operation state of the load to which the energy intelligent terminal corresponds when the calculation for operation mode is in the disabled state, the state of the energy intelligent terminal to change to the state in which the change of the external input power is kept to a minimum, see Table 1 for details.

That is to say, in the duty cycle, in response to a change in the state of the corresponding load, the corresponding energy intelligent terminal is controlled so that its operation mode is changed in a direction that the external input power changes little, so as to maintain the correspondence between the total external input power of the distributed energy system and the target power to reduce the influence of the change in the state of the energy intelligent terminal itself on the external input power, thereby realizing the real-time regulation of the distributed energy system. The regulating method is simple and improves the stability of the distributed energy system.

It should be understood that the current energy storage of the corresponding battery should be considered when performing the state switching. For example, in case 2, assuming that the current energy storage of the battery before the change of the operation state is full, the operation mode cannot be switched to one that charges the battery or the like.

In the present embodiment, the energy intelligent terminal determined as the master node controls each energy intelligent terminal in the distributed energy system to set the calculation for operation mode in the enabled state when the target power changes or a new duty cycle is started at the end of current duty cycle, so as to make each energy intelligent terminal determine an operation mode for the next duty cycle form the corresponding set of alternative operation modes. Therefore, according to the present embodiment, the operation mode of the distributed energy system can be regulated in real time and quickly. The regulating method is simple and improves the efficient and stability of the distributed energy system.

Figure 8:
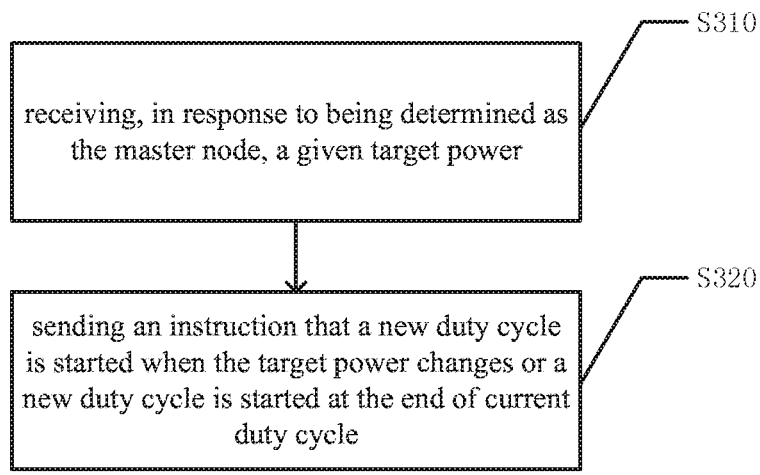
FIG. 8 is a flow chart of another control method for the energy intelligent terminal according to an embodiment of the present disclosure.

FIG. 8 is a flowchart of another control method for an energy intelligent terminal according to an embodiment of the present disclosure. As shown in FIG. 8, the another control method for the energy intelligent terminal according to the embodiment of the present disclosure includes the following steps:

Step S310, receiving, in response to being determined as the master node, a given target power.

Step S320, sending an instruction that a new duty cycle is started when the target power changes or a new duty cycle is started at the end of current duty cycle to control each energy intelligent terminal in the distributed system to set calculation for operation mode in an enabled state, so as to control each energy intelligent terminal to determine an operation mode for the next duty cycle from a corresponding set of alternative operation modes.

In one embodiment, the master node initiates and establishes a spanning tree that connects all the slave nodes in the distributed energy system, and sends an instruction that the calculation for operation mode is set in the enabled state to each energy intelligent terminal according to the connection relationship of the spanning tree. It should be understood that the master node controls each energy intelligent terminal to initialize its corresponding mode probability distribution to an initial mode probability distribution when the target power changes or a new duty cycle is started at the end of one duty cycle.

In one embodiment, controlling each energy intelligent terminal to determine an operation mode for the next duty cycle form a corresponding set of alternative operation modes comprises: updating, in response to the error between a sum of initial random external input power that can be assumed by each of all the energy intelligent terminals and the target power satisfying an iteration start condition, the alternative operation mode for each energy intelligent terminal in an iterative manner until an iteration exit condition being satisfied, and sending an instruction that the iteration is exited to each energy intelligent terminal so as to make each energy intelligent terminal determine the alternative operation mode to which the final iteration period corresponds as the operation mode for the next duty cycle, wherein, in each iteration period, each energy intelligent terminal is controlled to regulate its corresponding mode probability distribution and the alternative operation mode is reselected based on the regulated mode probability distribution. The iteration exit condition comprises that the error between the sum of the random external input power and the target power in the iteration period is less than or equal to an error threshold, and the initial random external input power is obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution. The implementation for determining the operation mode for the next duty cycle in the present embodiment is as that described in the steps of FIG. 7 and will not be repeated in details herein again.

In the present embodiment, the energy intelligent terminal determined as the master node controls each energy intelligent terminal in the distributed energy system to set the calculation for operation mode in the enabled state when the target power changes or a new duty cycle is started at the end of current duty cycle, so as to make each energy intelligent terminal determine an operation mode for the next duty cycle form the corresponding set of alternative operation modes. Therefore, according to the embodiments of the present disclosure, the operation mode of the distributed energy system can be regulated in real time. The regulating method is simple and improves the efficient and stability of the distributed energy system. Moreover, the distributed energy system according to the embodiments of the present disclosure has ad hoc network capability with the characteristics of fast deployment and plug and play terminals.

The foregoing descriptions are merely preferred embodiments of the present disclosure, and are not intended to limit the present disclosure. For those skilled in the art, the present disclosure may have various modifications and variations. Any modification, equivalent replacement, improvement and the like made within the spirit and principle of the present disclosure should be incorporated in the protection scope of the present disclosure.

The invention claimed is:

1. A control method for a distributed energy system, wherein the distributed energy system comprises multiple energy intelligent terminals connected through a network, and the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

determining an energy intelligent terminal as a master node and other energy intelligent terminals as slave nodes;

controlling, by the master node, each energy intelligent terminal to set the calculation for operation mode in an enabled state in response to a change in target power or a new duty cycle being started at the end of current duty cycle;

determining, by each energy intelligent terminal in response to the calculation for operation mode being set in the enabled state, an operation mode for the next duty cycle from the corresponding set of alternative operation modes, comprising:

updating, in response to the error between a sum of initial random external input power that can be assumed by each of all the energy intelligent terminals and the target power satisfying an iteration start condition, the alternative operation mode for each energy intelligent terminal in an iterative manner until an iteration exit condition being satisfied, the iteration exit condition comprising the error between the sum of the random external input power and the target power in the iteration period being less than or equal to an error threshold, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution; and determining the alternative operation mode for each energy intelligent terminal in the final iteration period as the operation mode for the next duty cycle, wherein, in each iteration period, the mode probability distribution to which each energy intelligent terminal corresponds is regulated and the alternative operation mode is reselected based on the regulated mode probability distribution; and setting the calculation for operation mode in a disabled state.

2. The control method according to claim 1, wherein controlling, by the master node, each energy intelligent terminal to set the calculation for operation mode in an enabled state in response to a change in target power or a new duty cycle being started at the end of current duty cycle comprises:

initiating and establishing, by the master node, a spanning tree that connects all the slave nodes in the distributed energy system; and sending, by the mast node, an instruction that the calculation for operation mode is set in the enabled state to each energy intelligent terminal according to the connection relationship of the spanning tree.

3. The control method according to claim 1, wherein regulating, in each iteration period, the mode probability distribution to which each energy intelligent terminal corresponds comprises:

initializing, in response to a change in operation state of the load and/or the battery to which the energy intelligent terminal corresponds, the mode probability distribution to which the energy intelligent terminal corresponds.

4. The control method according to claim 1, wherein the control method further comprises:

controlling, in response to a change in operation state of the load to which the energy intelligent terminal corresponds when the calculation for operation mode is in the disabled state, the state of the energy intelligent terminal to change to the state in which the change of the external input power is kept to a minimum.

5. The control method according to claim 4, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to continue to charge the battery in response to the load being switched from a working state to a disconnection state when the external input supplies power to both of the load and the battery.

6. The control method according to claim 4, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to charge the battery in response to the load being switched from a working state to a disconnection state when the external input supplies power to the load.

7. The control method according to claim 4, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a discharging state to a disconnection state in response to the load being switched from a working state to a disconnection state when there is no external input.

8. The control method according to claim 4, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the external input to supply power to the load in response to the load being switched from a disconnection state to a working state when the external input charges the battery, and controlling the external input to stop charging the battery.

9. The control method according to claim 4, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:

controlling the battery to be switched from a disconnection state to a discharging state to supply power to the load in response to the load being switched from a disconnection state to a working state when there is no external input.

10. A control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

setting calculation for operation mode in an enabled state after receiving an instruction that target power changes or next duty cycle is started; and determining an operation mode for the next duty cycle from a set of alternative operation modes to which the energy intelligent terminal corresponds through the calculation for operation mode comprising:

updating the alternative operation mode in an iterative manner in response to an instruction that an iteration is started; and determining, in response to an instruction that the iteration is exited, the alternative operation mode to which the final iteration period corresponds as the operation mode for the next duty cycle, wherein, in each iteration period, the corresponding mode probability distribution is regulated and the alternative operation mode is reselected based on the regulated mode probability distribution, and setting the calculation for operation mode in a disabled state.

11. The control method according to claim 10, wherein regulating, in each iteration period, the corresponding mode probability distribution comprises:

initializing, in response to a change in operation state of the load and/or the battery to which the energy intelligent terminal corresponds, the mode probability distribution to which the energy intelligent terminal corresponds.

12. The control method according to claim 10, wherein the control method further comprises:

controlling, in response to a change in operation state of the load to which the energy intelligent terminal corresponds when the calculation for operation mode is in the disabled state, the state of the energy intelligent terminal to change to the state in which the change of the external input power is kept to a minimum.

13. The control method according to claim 12, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:
controlling the battery to be switched from a disconnection state to a discharging state to supply power to the load in response to the load being switched from a disconnection state to a working state when there is no external input.

14. The control method according to claim 12, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:
controlling the external input to supply power to the load in response to the load being switched from a disconnection state to a working state when the external input charges the battery, and controlling the external input to stop charging the battery.

15. The control method according to claim 12, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:
controlling the external input to continue to charge the battery in response to the load being switched from a working state to a disconnection state when the external input supplies power to both of the load and the battery.

16. The control method according to claim 12, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:
controlling the external input to charge the battery in response to the load being switched from a working state to a disconnection state when the external input supplies power to the load.

17. The control method according to claim 12, wherein controlling, in response to a change in operation state of the load to which the energy intelligent terminal corresponds when the calculation for operation mode is in the disabled state, the state of the energy intelligent terminal to be changed to the state in which the change of the external input power is kept to a minimum comprises:
controlling the battery to be switched from a discharging state to a disconnection state in response to the load being switched from a working state to a disconnection state when there is no external input.

18. A control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:
sending, in response to being determined as a master node, an instruction that next duty cycle is started to control each energy intelligent terminal in a distributed energy system to set calculation for operation mode in an enabled state when target power changes or the new duty cycle is started at the end of current duty cycle, so as to control each energy intelligent terminal to determine an operation mode for the next duty cycle from the corresponding set of alternative operation modes;
wherein determining the operation mode for the next duty cycle from a set of alternative operation modes comprises:
updating the alternative operation mode in an iterative manner in response to an instruction that an iteration is started; and
determining, in response to an instruction that the iteration is exited, the alternative operation mode to which the final iteration period corresponds as the operation mode for the next duty cycle, wherein, in each iteration period, the corresponding mode probability distribution is regulated and the alterative operation mode is reselected based on the regulated mode probability distribution.

* * * * *